April 16, 1963  H. B. RICH  3,085.652

STEP LADDER

Filed March 20, 1961

INVENTOR.
HOWARD B. RICH
BY
Pearce and Schaeferklaus
ATTORNEYS

United States Patent Office 3,085,652
Patented Apr. 16, 1963

3,085,652
STEP LADDER
Howard B. Rich, Carrollton, Ky., assignor to Howard B. Rich, Inc., Carrollton, Ky., a corporation of Kentucky
Filed Mar. 20, 1961, Ser. No. 96,736
2 Claims. (Cl. 182—228)

This invention relates to stepladders and to a step construction for a stepladder.

An object of this invention is to provide a sturdy, light weight, rigid step construction for a stepladder.

A further object of this invention is to provide a ladder having wood side rails and strong, sturdy metal steps, so constructed that the steps are safely and strongly secured to the side rails and in which the securing means which attaches the steps to the side rails serves also to reinforce and support the steps.

A further object of this invention is to provide a sheet metal step construction for a stepladder of this type having a tread portion at edges of which are formed downwardly extending flanges one of which embraces and surrounds a tension rod which links side rails of the ladder below the tread portion and adjacent front edges of the rails, the other flange including a return bent portion terminating in a curved or rounded edge portion which underlies the tread and receives a second tension rod so that the second tension rod underlies and supports the tread portion and the first tension rod and its flange stiffen and support the front edge of the tread portion.

The above and other objects and features of the invention will be apparent to those skilled in the art to which this invention pertains from the following detailed description, and the drawing, in which.

Figure 1:
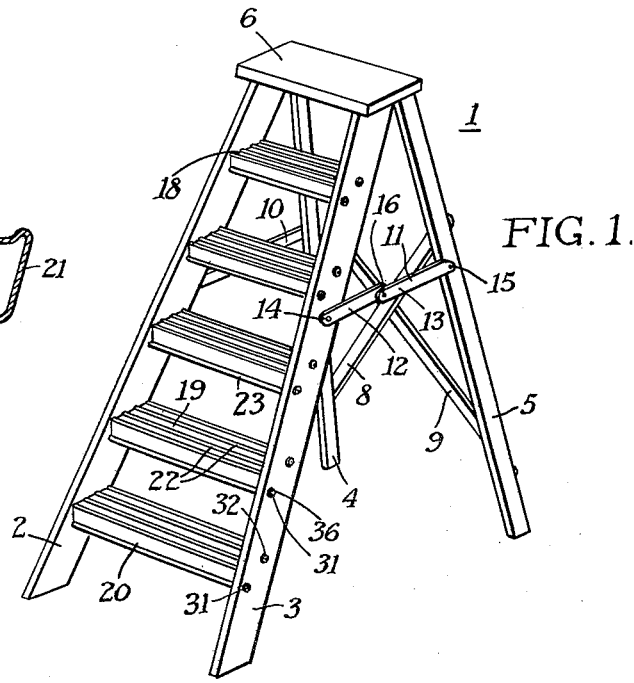
FIG. 1 is a perspective view of a stepladder constructed in accordance with an embodiment of this invention.

In FIG. 1 of the drawings is shown a collapsible stepladder 1 having side rails 2 and 3 hinge-connected at their upper ends to brace or stay legs 4 and 5. The upper end of the ladder is provided with a platform 6. The stay legs 4 and 5 are provided with cross braces 8 and 9. The rails 2 and 3 are connected to the stay legs 4 and 5 by means of braces 10 and 11, which may be of usual construction. As shown, each of the braces 10 and 11 comprises links 12 and 13 which are hinged at 14 and 15 to the side rails and stay legs, as shown. Adjacent ends of the links are hinged together, as at 16.

Figure 2:
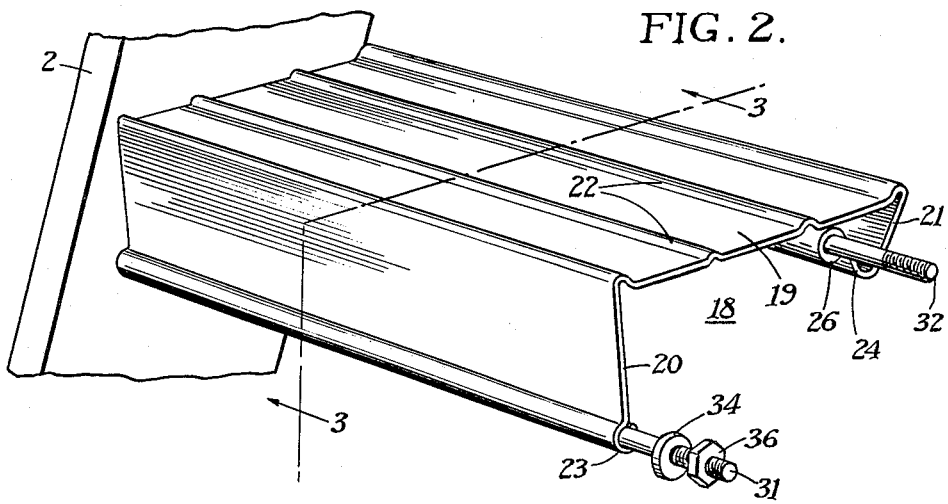
FIG. 2 is an enlarged perspective view showing a portion of one side rail and one step.
Figure 3:
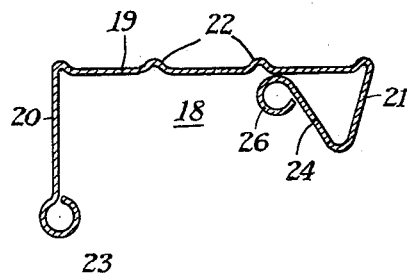
FIG. 3 is a view in section taken on the line 3—3 in FIG. 2, showing the step in transverse section, the step being removed from the ladder.

The ladder is provided with steps 18, the construction of which is more particularly shown in FIGS. 2 and 3.

Each tread or step is formed of sheet metal, such as aluminum, steel, or the like formed to the shape shown in cross-section in FIG. 3 and is provided with a relatively broad tread portion 19 having downwardly projecting front and rear flanges 20 and 21 along opposite edges thereof. The tread portion 19 may be provided with ribs 22 which serve to strengthen the step and to prevent slippage when a person stands on the step.

At the lower edge of the front flange 20 is formed a hollow bead 23 spaced downwardly from the tread position 19 as shown in FIG. 3. A return bend portion 24 is integrally formed with rear flange 21. The return bend portion or flange 24 terminates in a bead 26 which underlies and is abutted by the tread portion 19 intermediate the front and rear edges. As shown most clearly in FIG. 2, the beads 23 and 26 receive tie rods 31 and 32. As is shown in FIGS. 1 and 2, the tie rods extend through the side rails 2 and 3. Each end of each tie rod carries a washer 34 and a nut 36, threaded on the tie rod. The washers engage outer faces of the side rails 2 and 3 so that, when the nuts 36 are tightened, the side rails are drawn and compressed against ends of the steps. As shown most clearly in FIG. 2, the front flange 20 is upright, and the bead 23 at the lower edge thereof is spaced from edges of the rails.

The tie rods 31 and 32 may be of steel wire or the like. The tie rod 32 immediately underlies and serves to support the tread portion of the step. The tie rod 31 underlies the upright front flange 20 and cooperates with the flange 20 to stiffen and rigidify the front edge of the tread.

The stepladder construction illustrated in the drawing and described above is subjected to structural modification without departing from the spirit and scope of the appended claims.

Having described my invention, what I claim as new and desire to secure by Letters Patent is:

1. A ladder which comprises a pair of side rails, a plurality of sheet metal step members spanning said rails, each of said step members comprising a tread portion, downwardly projecting flanges along and coextensive with front and rear edges of the tread portion, the front flange being perpendicular to the tread portion, a bead at the lower edge of the front flange underlying and spaced below the front edge of the tread portion, an upwardly and inwardly projecting return flange on the lower edge of the rear flange, and a bead on the upper and inner edge of the return flange, said last mentioned bead abutting the underside of the tread portion, and a pair of tension rods, each of said tension rods being received inside one of the beads and spanning the side rails, the tread portion resting on the last mentioned bead and being supported by the tension rod received therein, the tension rod received in the first mentioned bead supporting the flange on the front edge of the tread portion and cooperating with the flange on the front edge of the tread portion to stiffen and support the front edge, the front edge being unobstructed.

2. A ladder which comprises a pair of side rails, a plurality of sheet metal step members spanning said rails, each of said step members comprising a tread portion, a downwardly projecting flange along and coextensive with a front edge of the tread portion, the flange being perpendicular to the tread portion, a bead at the lower edge of the flange underlying and spaced below the front edge of the tread portion, a tension rod received inside said bead and spanning the side rails, the tension rod supporting the flange on the front edge of the tread portion and cooperating with the flange on the front edge of the tread portion to stiffen and support the front edge, the front edge of the tread portion being unobstructed, and means mounted on the rails for supporting the rear edge of the tread portion.

References Cited in the file of this patent
UNITED STATES PATENTS

| | | |
|---|---|---|
| 1,087,878 | Harrah | Feb. 17, 1914 |
| 2,485,165 | Pollman | Oct. 18, 1949 |
| 2,844,292 | Rich | July 22, 1958 |